(No Model.) 2 Sheets—Sheet 1.
A. BROSIUS.
TRACTION WHEEL.
No. 437,674. Patented Oct. 7, 1890.
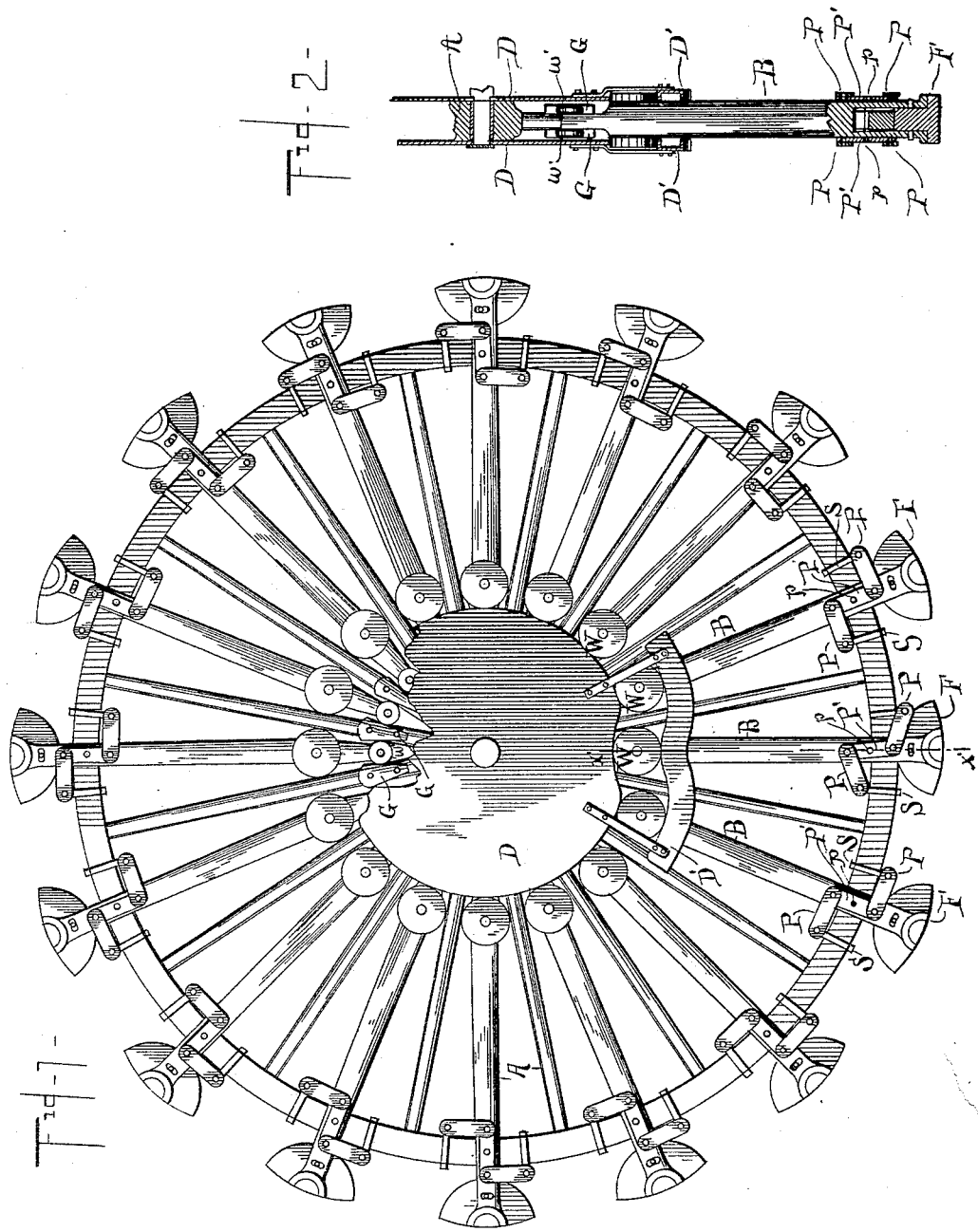
WITNESSES: INVENTOR
Aaron Brosius
BY
H. C. Hartman
ATTORNEY.

(No Model.) 2 Sheets—Sheet 2.
A. BROSIUS.
TRACTION WHEEL.
No. 437,674. Patented Oct. 7, 1890.
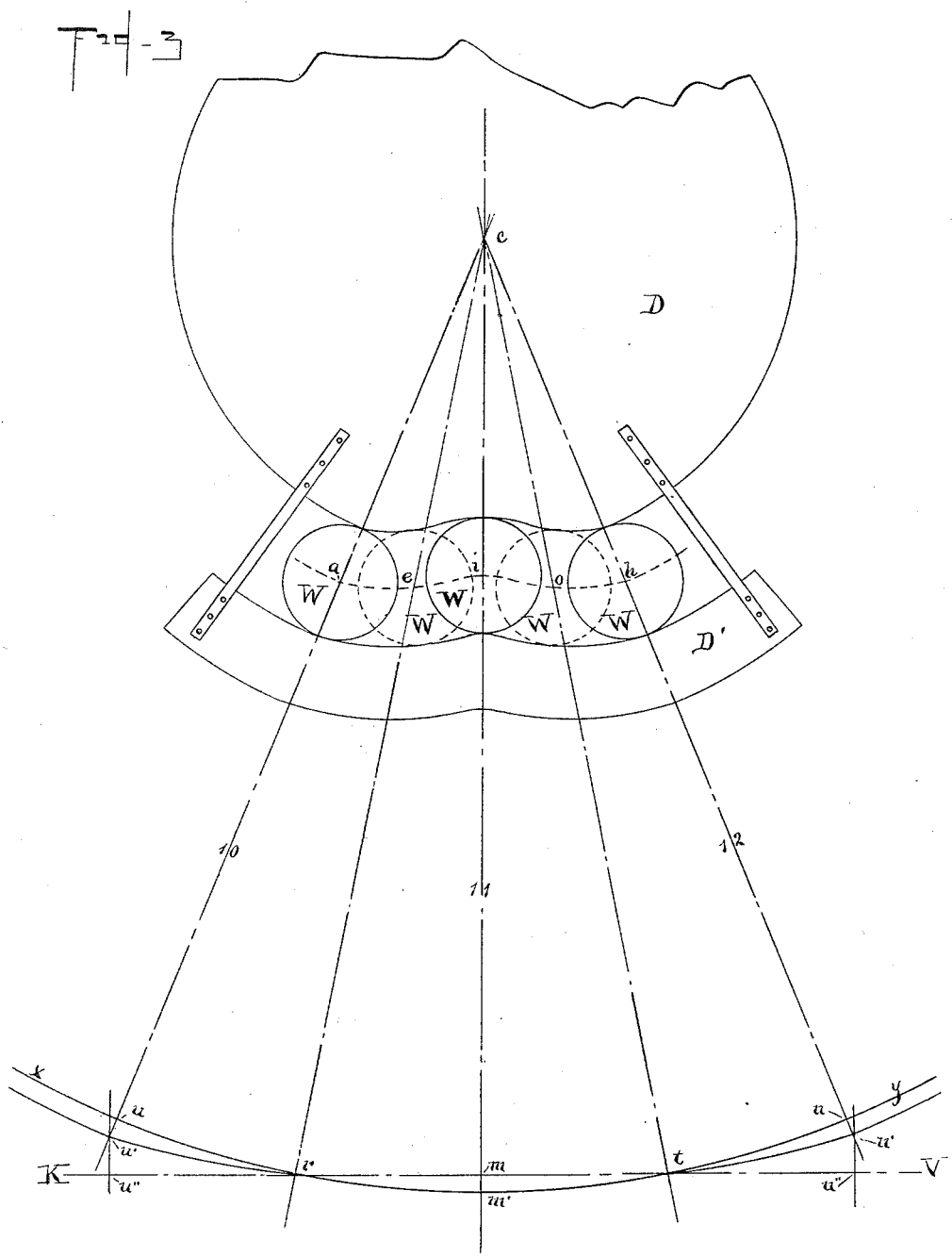
WITNESSES:
Wm S. Hulse
E. M. Hulse
INVENTOR
Aaron Brosius
BY
H. C. Hartman
ATTORNEY.

UNITED STATES PATENT OFFICE.

AARON BROSIUS, OF FORT WAYNE, INDIANA.

TRACTION-WHEEL.

SPECIFICATION forming part of Letters Patent No. 437,674, dated October 7, 1890.

Application filed March 12, 1890. Serial No. 343,612. (No model.)

*To all whom it may concern:*

Be it known that I, AARON BROSIUS, a citizen of the United States, residing at Fort Wayne, in the county of Allen and State of Indiana, have invented certain new and useful Improvements in Traction-Wheels; and I do hereby declare the following to be a full, clear, and exact description of the invention, such as will enable others skilled in the art to which it appertains to make and use the same.

My invention relates to improvements in wheels for vehicles where the weight is carried on traveling rests, bars, or feet, instead of on the periphery of the wheels; and the objects of my invention are to construct a wheel for vehicles with such attachments and mechanism that it will travel on foot-bars or foot-rests in such a manner that as the vehicle is moved or drawn forward successively from one foot-bar or foot-rest to another that the body of the vehicle will not be raised or lowered thereby, and also to provide against any sliding motion of the foot-bars or foot-rests on the ground by reason of such movemnt, so that when the foot-bar or foot-rest strikes the ground, however uneven it may be, it will remain in the same place without sliding until it is lifted by the revolution of the wheel as the vehicle is moved forward. I attain these objects by means of the mechanism illustrated in the accompanying drawings, in which—

Figure 1 is a side elevation of the wheel with part of the disk broken away to show wheels W and guides G. Fig. 2 is a cross-section through bar of wheel on line X' X', and Fig. 3 is a diagram illustrating construction of the curvilinear bearing-line of disk.

To a wheel A, provided with suitable spokes or arms, I place foot-bars B between the spokes or arms and attach them thereto in such a manner that the bars B are adapted and limited to a radial motion. This may be done by placing them between or attaching them to suitable guides; but a preferable mode of construction for this purpose is shown in Fig. 1, and is as follows: The bars B are provided at their inner ends with small wheels W', adapted to revolve and move in the guides G, attached to the spokes. Near the other ends of the bars B a slot (shown in Fig. 2) is made in each, so that the bars B inclose the felly, and the length of the slot is such as to permit a limited radial motion to the bars. Supports S are attached to the fellies on both sides of the bars, one projecting inside of the felly and the other outside, as shown. To these supports are jointed the plates P on both sides of the support S, their other ends being also joined, respectively, to the plates P', placed on both sides of the bars B and jointed thereto at their centers at *p*, as shown. By these devices the bars B are secured to the wheel and are adapted and confined to a radial motion with little friction. To the outer ends of these bars B, feet F, preferably in the form shown, are jointed, so as to be adapted to swing backward and forward slightly, as will appear from the drawings, the center of motion being made at the bottom and in the center line of the foot-bars B drawn radially. The foot-bars B may be used without feet, if desired; but the feet aid the utility of the device by opposing a broader surface to the ground and preventing any oscillating motion. To the upper part of the bars B, at equal distances from their outer ends and preferably on both sides, supporting-wheels W are mounted revolubly on pivots or axles attached to the bars B.

Disks D are placed preferably on both sides of the wheel and secured rigidly to the axle of the vehicle. These disks are preferably made of flat pieces of metal of suitable thickness, the upper part of their periphery forming a circular curve and the lower part being made curvilinear and constituting the bearing portion of the disk, the entire periphery forming a track, around which the wheels W are revolved. A guide-plate D', with corresponding curves, is attached to the disk D, as shown, to hold the wheels W in loose contact with the disk D and cause them to revolve on the curvilinear bearing without binding them or impeding their motion. The curvilinear part of the disk D forms the bearing portion and is one of the essential elements of my invention. Its construction requires particular explanation.

In constructing a wheel I first determine the height the center of the wheel is to be above the ground. Then to get this curvilinear bearing I draw a diagram, Fig. 3, as follows: Fixing the center of the wheel at $c$, I draw the perpendicular line $c\ m$ the exact length of such height. Through the point $m$, I draw the line $k\ v$ at right angles to the line $c\ m$. This diagram is drawn for a wheel with sixteen-foot bars. Placing such a wheel with its center at $c$ and two feet of two of its foot-bars on the line $k\ v$ with their centers equidistant from the point $m$, I mark such points of contact with the letters $r$ and $t$. By construction the central radial lines of the foot-bars projected would intersect the line $k\ v$ at the same points. I then draw the circular line $x\ m'\ y$, using the line $c\ r$ as a radius. The line $r\ m'\ t$ is thus made an arc of such circle exactly one-sixteenth of its circumference and measures the equal distances between the center lines of the foot-bars intersecting such circle. Such arcs being equal, it follows the chords are also equal and are measured by the straight line $r\ m\ t$. I now fix the points $u$ and $n$ by placing them the length of the arc $r\ m'\ t$ from $m$, respectively, on the circle $x\ m'\ y$, and I draw radial lines through the points $u, r, t,$ and $n$. Placing the wheel with its center at $c$ and one of its foot-bars coinciding with the line $c\ m$, with its foot resting at $m$, I mark the position of the center of its wheel W with the letter $i$. The two foot-bars on either side will then coincide with the radial lines $c\ u$ and $c\ n$, and I mark these foot-bars with the numerals 10, 11, and 12, and I fix the points $e$ and $o$ on the radial line $c\ r$ and $c\ t$ at the same distance, respectively, from $r$ and $t$ that $i$ is from $m$. Placing the points $u''$ and $n''$ the length of the chord $r\ m\ t$ from $m$, respectively, on the line $k\ v$, I draw perpendicular lines intersecting the line $k\ v$ at those points. The points $u'$ and $n'$ are placed at and fixed by the intersection of these perpendicular lines with the radial lines $c\ u$ and $c\ n$, extended, respectively. The points $a$ and $h$ on these radial lines are placed the same distance from $u'$ and $n'$, respectively, that $i$ is from $m$, and it follows that if the feet of the foot-bars 10 and 12 are placed on these points, respectively, the centers of their wheels W will be, respectively, at the points $a$ and $h$. I have not drawn these foot-bars, as it confuses the diagram. They are represented by the lines $c\ u'$, $c\ m$, and $c\ n'$. I draw circles to represent their wheels W, their centers being fixed, as described, at $a$, $i$, and $h$. By moving the wheel, the center being kept at $c$, in the direction of from $x$ to $y$ and moving the foot-bars 10 and 11 radially, so that the foot of bar 11 shall pass on and describe a line of travel coincident to the half-chord $m\ t$, and the foot of bar 10 shall at all times be at exactly the same distance from the foot of bar 11, measured on the line $k\ v$ between perpendiculars passing through their centers and intersecting the radial lines of the bars, the line of travel of the foot of bar 10 will describe the curve $u'\ r$ and the center of its wheel W will describe the curve $a\ e$. At the same time the center of the wheel W of the foot-bar 11 will describe the curve $i\ o$. Moving the wheel still farther and keeping the foot of bar 10 on the line of the half-chord $r\ m$, and the foot of the bar 11 in exactly the same relation, as above described, by moving it radially, the curve $e\ o$ is described by the center of the wheel W of the bar 10, and the curve $o\ h$ is described by the center of the wheel W of the bar 11. The curvilinear lines of the disk D and the guide D' are drawn correspondingly to the curvilinear line $e\ o\ h$ thus ascertained, the rest of the disk D being circular, as shown in the drawings. It will be noticed that by this construction as one foot is lifted from the ground by the movement of the wheel A another impinges against it; but the center of the axle is maintained in the same plane as when one of the foot-bars is perpendicular to such center, and that as the center of the wheel moves on to a point perpendicular to the center of the foot there is no change or variation in the plane of movement of the axle.

I have discovered that to prevent any movement of the foot-bars or foot-rests on the ground after they once strike or impinge against it and until they leave it, it is necessary that the distances between the centers of the treads of the bars or feet so impinging shall be confined to exactly the same distances between each other while so impinging, and that such distances must be measured on horizontal lines and not on curves. My invention is based on such discovery.
The above explanation of the movement of the foot-bars and the formation of this curvilinear line and their purposes also explains the particular operation of the devices. It may be said further of the operation that the contact of the end of the foot-bar B or of its foot F, where feet are used, with the ground does not tend to impede the motion, because the radial motion permitted to the bar and the curvilinear bearing are so adapted that the bar B rises toward the center of the wheel and at the same time supports it, so that there is no tendency to raise the center of the wheel above the plane of its previous motion, and as the wheel moves forward this plane of motion of the axle, and with it that of the body of the vehicle, is maintained as perfectly as if the vehicle were moving forward on ordinary wheels. The foot-bars or foot-rests are superior in use to the ordinary wheels, in this, that they remain exactly in the same spot at which they first impinge against the ground under all circumstances, while it is well known that in wet or soft ground, or where there are obstacles by reason of the unevenness of the road-bed, the rims of the ordinary wheels are more or less locked thereby and are dragged or slid more or less, this being particularly the case in soft ground, and thereby the tractive force must be greatly increased to overcome such difficulties.

Having thus described my invention, what I claim as new, and desire to secure by Letters Patent, is—

1. In a traction-wheel, the combination of independent foot-bars adapted and confined to a limited radial motion, with bearing-wheels adapted to be revolved on a disk or wheel rigidly attached to the axle, and the curvilinear bearing constructed, as described, to form the bearing portion of the disk or wheel, substantially as described.

2. The combination, with a wheel, of the foot-bars B, the guide-plates G, the wheels W, the plates P and P', the supports S, the bearing-wheels W, the feet F, the disk D, rigidly attached to the axle, the curvilinear bearing, and the guide-plate D', substantially as described.

3. In a traction-wheel the combination of independent foot-bars attached thereto adapted and confined to a limited radial motion, with feet attached thereto adapted to slight oscillation, the center of motion being at the bottom of the feet and in line with the center lines of the foot-bars drawn radially, substantially as described.

4. In a traction-wheel adapted to move on foot bars or rests, the combination of bearing-wheels, with a curvilinear bearing constructed therefor, as described.

In testimony whereof I have hereto affixed my signature in the presence of two witnesses.

AARON BROSIUS.

Witnesses:
H. C. HARTMAN,
ALBERT BAKER.